(12) United States Patent
Reddy et al.

(10) Patent No.: US 10,220,934 B2
(45) Date of Patent: Mar. 5, 2019

(54) FIRE-RESISTANT AVIATION LAMINATE

(71) Applicant: Goodrich Corporation, Charlotte, NC (US)

(72) Inventors: Chana Kesava Reddy, Kushaiguda (IN); Ashish Kumar Agarwal, Bangalore (IN); Satya Swaroop Panda, Bangalore (IN); Christopher L. Chapman, Lanesville, IN (US)

(73) Assignee: GOODRICH CORPORATION, Charlotte, NC (US)

( * ) Notice: Subject to any disclaimer, the term of this patent is extended or adjusted under 35 U.S.C. 154(b) by 107 days.

(21) Appl. No.: 15/052,515

(22) Filed: Feb. 24, 2016

(65) Prior Publication Data

US 2017/0240264 A1 Aug. 24, 2017

(51) Int. Cl.
| | | |
|---|---|---|
| *B64C 1/40* | (2006.01) | |
| *B32B 21/08* | (2006.01) | |
| *B32B 7/12* | (2006.01) | |
| *B32B 27/20* | (2006.01) | |
| *B32B 21/14* | (2006.01) | |
| *B32B 27/08* | (2006.01) | |
| *B32B 27/12* | (2006.01) | |

(Continued)

(52) U.S. Cl.
CPC ............. *B64C 1/40* (2013.01); *B32B 7/12* (2013.01); *B32B 21/08* (2013.01); *B32B 21/14* (2013.01); *B32B 27/08* (2013.01); *B32B 27/12* (2013.01); *B32B 27/18* (2013.01); *B32B 27/20* (2013.01); *B32B 27/306* (2013.01); *B32B 27/38* (2013.01); *B32B 27/42* (2013.01); *B64C 1/066* (2013.01); *B32B 2250/02* (2013.01); *B32B 2250/24* (2013.01); *B32B 2262/10* (2013.01); *B32B 2262/101* (2013.01); *B32B 2264/108* (2013.01); *B32B 2307/3065* (2013.01); *B32B 2307/732* (2013.01); *B32B 2605/18* (2013.01); *B64D 2045/009* (2013.01)

(58) Field of Classification Search
CPC .. B64C 1/40; B32B 7/12; B32B 21/08; B32B 27/20

See application file for complete search history.

(56) References Cited

U.S. PATENT DOCUMENTS

| 6,855,393 B1 * | 2/2005 | Ayres | ........................ B32B 3/12 |
| | | | 156/306.9 |
| 8,083,878 B1 * | 12/2011 | Booth | ....................... B32B 7/12 |
| | | | 156/153 |

(Continued)

FOREIGN PATENT DOCUMENTS

| GB | 2299054 A | 9/1996 |
| WO | 9420055 A1 | 9/1994 |

(Continued)

OTHER PUBLICATIONS

Extended European Search Report for application No. 16197922.4-1377 dated Mar. 30, 2017 (7 pages).

*Primary Examiner* — Justin M Benedik
(74) *Attorney, Agent, or Firm* — Cantor Colburn LLP

(57) ABSTRACT

An aviation laminate includes an intumescent backer sheet covered by a decorative sheet. The aviation laminate is generally fire-resistant, may be structural, and may be used to construct various components within an aircraft cabin that may be held to government/regulatory fire mitigation requirements.

20 Claims, 2 Drawing Sheets

(51) Int. Cl.
  *B32B 27/18*   (2006.01)
  *B32B 27/30*   (2006.01)
  *B32B 27/38*   (2006.01)
  *B32B 27/42*   (2006.01)
  *B64C 1/06*    (2006.01)
  *B64D 45/00*   (2006.01)

(56) References Cited

U.S. PATENT DOCUMENTS

2009/0255694 A1* 10/2009 Peitz ............... B65D 88/14
                                               169/48
2011/0283458 A1* 11/2011 Gillette ............ A47C 31/001
                                               5/698
2012/0015176 A1*  1/2012 Riebel ............. B32B 27/06
                                               428/323

FOREIGN PATENT DOCUMENTS

| WO | 0134724 A1     | 5/2001  |
| WO | 2004110951 A1  | 12/2004 |
| WO | 2010028352 A1  | 3/2010  |
| WO | 2013004306 A1  | 1/2013  |

* cited by examiner

FIRE-RESISTANT AVIATION LAMINATE

CROSS REFERENCE TO RELATED APPLICATION

This patent application claims priority to India Patent Application Serial No. 3683/DEL/2015 filed Nov. 10, 2015, the entire contents of which is incorporated herein by reference.

BACKGROUND

The present disclosure relates to laminates and, more particularly, to a fire-resistant aviation laminate used for interior cabin components in the aviation industry.

Traditional veneer systems used in aircraft interiors must undergo chemical treatment to meet fire resistant requirements of various government agencies. Known processes of treating the veneers is vary labor intensive and the effectiveness varies. Moreover, known treatment methods may not yield consistent results and some veneers may require retreatment. Yet further, known fire retardant solutions used in the chemical treatments may discolor the veneer and/or are not environmentally friendly. Alternative fire-resistant and/or chemical friendly materials for use in an aircraft cabin is desirable.

SUMMARY

An aviation laminate according to one, non-limiting, embodiment of the present disclosure includes an intumescent backer sheet; and a decorative sheet engaged to the intumescent backer sheet.

Additionally to the foregoing embodiment, the intumescent backer sheet is a polymer matrix infused with an intumescent material.

In the alternative or additionally thereto, in the foregoing embodiment, the intumescent backer sheet is made of mineral fiber, exfoliating graphite and an organic binder.

In the alternative or additionally thereto, in the foregoing embodiment, the intumescent backer sheet is made of at least an expandable graphite.

In the alternative or additionally thereto, in the foregoing embodiment, the aviation laminate includes an adhesive layer for securing the intumescent backer sheet to the decorative sheet.

In the alternative or additionally thereto, in the foregoing embodiment, the adhesive layer includes a pressure sensitive adhesive.

In the alternative or additionally thereto, in the foregoing embodiment, the adhesive layer is one of an epoxy, a phenolic based adhesive, and a polyurethane based adhesive.

In the alternative or additionally thereto, in the foregoing embodiment, the decorative sheet is a plastic sheet.

In the alternative or additionally thereto, in the foregoing embodiment, the decorative sheet is a wood veneer.

In the alternative or additionally thereto, in the foregoing embodiment, the wood veneer is between about 0.015 to 0.022 inches thick.

In the alternative or additionally thereto, in the foregoing embodiment, the aviation laminate at least in-part forms a bulkhead.

In the alternative or additionally thereto, in the foregoing embodiment, the aviation laminate at least in-part forms a cabin door.

In the alternative or additionally thereto, in the foregoing embodiment, the aviation laminate at least in-part forms a cabin table top.

In the alternative or additionally thereto, in the foregoing embodiment, the aviation laminate at least in-part forms interior cabinetry.

An aircraft according to another, non-limiting, embodiment includes an interior cabin including cabinetry including an aviation laminate having an intumescent backer sheet and a decorative sheet engaged to the intumescent backer sheet, and wherein the laminate is fire and burn resistant.

Additionally to the foregoing embodiment, the intumescent backer sheet is made of mineral fiber, exfoliating graphite and an organic binder.

In the alternative or additionally thereto, in the foregoing embodiment, the intumescent backer sheet is made of at least an expandable graphite.

In the alternative or additionally thereto, in the foregoing embodiment, the intumescent backer sheet is pressure bonded to the decorative sheet.

In the alternative or additionally thereto, in the foregoing embodiment, the decorative sheet is a wood veneer.

In the alternative or additionally thereto, in the foregoing embodiment, the wood veneer is between about 0.015 to 0.022 inches thick.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
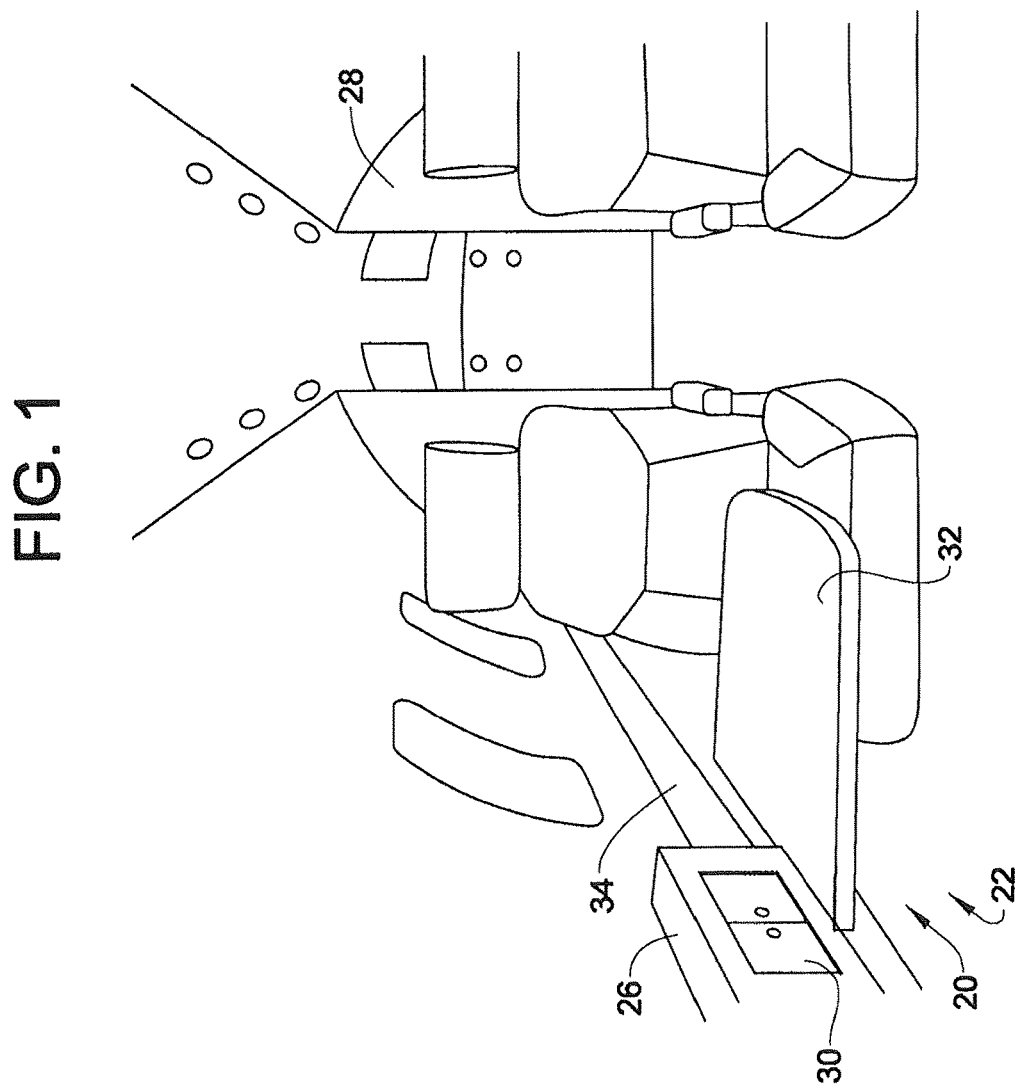
FIG. 1 is a perspective view of an interior cabin of an aircraft utilizing the fire-resistant aviation laminate of the present disclosure.
Figure 2:
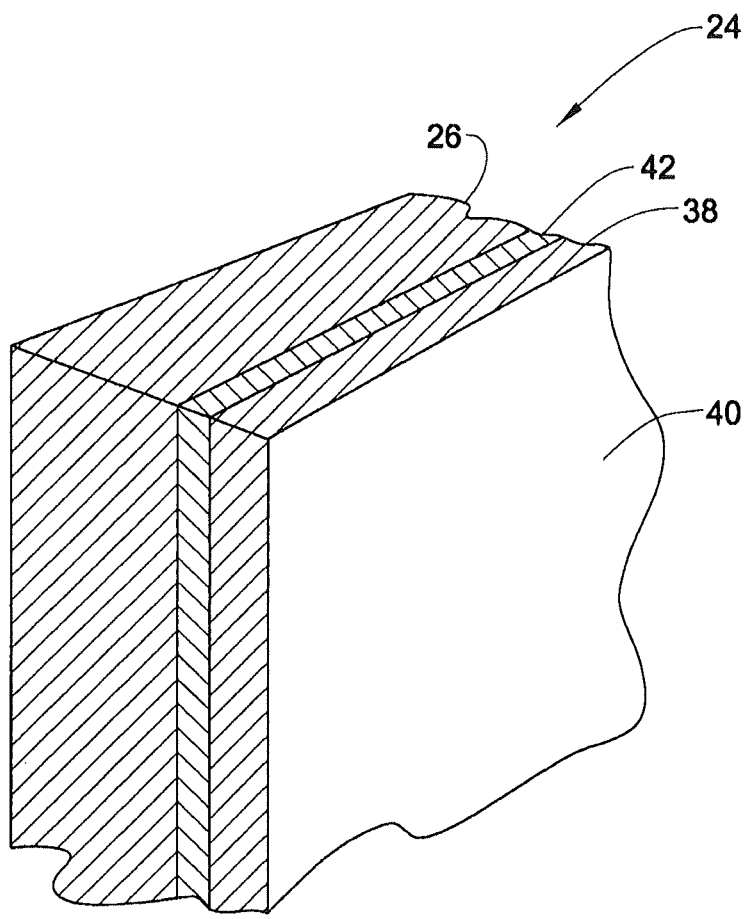
FIG. 2 is a perspective cross section of the aviation laminate.

Referring to FIGS. 1 and 2, an exemplary embodiment of an interior cabin 20 of an aircraft 22 is illustrated. The aircraft 22 may be any variety of aircrafts including helicopters and airplanes that may be designed in accordance with government regulations pertaining to the propagation of cabin fire and burn characteristics of interior cabin components. In accordance with the present disclosure, the cabin components are substantially made of an aviation laminate 24. The components may include, but are not limited to, interior cabinetry 26, bulkheads 28 (e.g., decorative walls), doors 30, table tops 32, credenzas 34 and other components that may include decorative surfaces.

The aviation laminate 24 includes an intumescent backer sheet 26 and an external sheet 38 that may include a decorative or finish surface 40. The intumescent backer sheet 26 may be rigid and structurally supportive and generally swells up (e.g., about twenty to forty times initial volume) when exposed to extreme heat, and thereby may prevent further propagation of fire. Furthermore, the intumescent feature of the backer sheet 26 not only functions as a fire stop, but may be fire resistant (i.e., fireproof) so as not to contribute toward fueling a fire. The intumescent backer sheet 26 may be made of a polymer matrix (e.g., epoxies, poly vinyl ester, or phenolic) infused with intumescent material. The intumescent backer sheet 26 may also be made of a polymer infused material such as a glass fiber, and/or made of a mineral fiber, exfoliating graphite and an organic binder. More generally, the intumescent backer sheet 26 may be made at least in-part of an expandable graphite.

The external sheet 38 may be decorative and generally seen by the naked eye. Non-limiting examples of the external sheet 38 may include decorative wood veneers, plastic materials having an appealing color and/or pattern, and various forms of paints or coatings. For the example of wood veneers, the veneer may not include intumescent qualities, and instead may be sufficiently thin so as not to contribute toward fire propagation. As one example, the exposed face veneer may be between 0.015 to 0.022 inches in thickness. It is further contemplated and understood that the external sheet 38 may also include intumescent qualities.

The decorative external sheet 38 may be bonded to the intumescent backer sheet 26 by an adhesive layer 42. The adhesive layer 42 may be a dry film adhesive (e.g., phenolic, epoxies, hot melt polyamide or polyurethane), a pressure sensitive adhesive, or any other variety of adhesives generally known in the art. It is further contemplated and understood that the external sheet 38 may be pressure bonded to the intumescent backer sheet 26 without the need for an adhesive layer 42.

The aviation laminate 24 and the various cabin components substantially made of the laminate 24 are substantially fire-resistant. In contrast, more traditional cabin components typically made of wood backers (e.g., plywood) are not fire-resistant, or to facilitate passing of government/regulatory flammability tests, the plywood must undergo time consuming salt-based treatments. The overall weight with respect to volume and/or strength of the laminate 24 may be substantially less than more traditional materials, which is particularly advantageous for the aviation industry. The overall thickness of the laminate 24 may be substantially less than more traditional materials, which is also advantageous for the aviation industry.

The laminate 24 may be planar and, during manufacturing of the various cabin components, may be cut to appropriate sizes and shapes. Alternatively, the laminate 24 may have a substantially consistent thickness, however, is formed to a desired three dimensional shape during the manufacturing process of the laminate 24 itself to conform to a particular cabin component shape or need.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An aircraft comprising:
    an interior cabin generally defined by a bulkhead, and including cabinetry fixed to the bulkhead and including an aviation laminate having an intumescent backer sheet and a decorative sheet engaged to the intumescent backer sheet, and wherein the laminate is fire and burn resistant, and the intumescent backer sheet is adapted to structurally support the decorative sheet.

2. The aircraft set forth in claim 1, wherein the intumescent backer sheet is made of mineral fiber, exfoliating graphite and an organic binder.

3. The aircraft set forth in claim 1, wherein the intumescent backer sheet is made of at least an expandable graphite.

4. The aircraft set forth in claim 1, wherein the intumescent backer sheet is pressure bonded to the decorative sheet.

5. The aircraft set forth in claim 1, wherein the decorative sheet is a wood veneer.

6. The aviation laminate set forth in claim 5, wherein the wood veneer is between about 0.015 to 0.022 inches thick.

7. An aviation laminate comprising:
    an intumescent backer sheet adapted to be visually unexposed and structural supportive; and
    a decorative sheet engaged to and structurally supported by the intumescent backer sheet.

8. The aviation laminate set forth in claim 7, wherein the intumescent backer sheet is a polymer matrix infused with an intumescent material.

9. The aviation laminate set forth in claim 7, wherein the intumescent backer sheet is made of mineral fiber, exfoliating graphite and an organic binder.

10. The aviation laminate set forth in claim 7, wherein the intumescent backer sheet is made of at least an expandable graphite.

11. The aviation laminate set forth in claim 7 further comprising:
    an adhesive layer for securing the intumescent backer sheet to the decorative sheet.

12. The aviation laminate set forth in claim 11, wherein the adhesive layer includes a pressure sensitive adhesive.

13. The aviation laminate set forth in claim 11, wherein the adhesive layer is one of an epoxy, a phenolic based adhesive, and a polyurethane based adhesive.

14. The aviation laminate set forth in claim 7, wherein the decorative sheet is a plastic.

15. The aviation laminate set forth in claim 7, wherein the decorative sheet is a wood veneer.

16. The aviation laminate set forth in claim 15, wherein the wood veneer is between about 0.015 to 0.022 inches thick.

17. The aviation laminate set forth in claim 7, wherein the aviation laminate is fixed to a bulkhead that defines an interior cabin of an aircraft.

18. The aviation laminate set forth in claim 17, wherein the aviation laminate at least in-part forms a cabin door engaged to the bulkhead.

19. The aviation laminate set forth in claim 17, wherein the aviation laminate at least in-part forms a cabin table top engaged to the bulkhead.

20. The aviation laminate set forth in claim 17, wherein the aviation laminate at least in-part forms interior cabinetry engaged to the bulkhead.

* * * * *